United States Patent
Nakagawa et al.

(10) Patent No.: US 8,492,005 B2
(45) Date of Patent: *Jul. 23, 2013

(54) JOINING METHOD AND JOINT STRUCTURE OF DISSIMILAR METAL

(75) Inventors: Shigeyuki Nakagawa, Yokosuka (JP); Kenji Miyamoto, Yokosuka (JP); Minoru Kasukawa, Tokyo (JP); Masao Aihara, Yokosuka (JP); Sadao Yanagida, Yokosuka (JP); Akio Hirose, Ibaraki (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 155 days.

This patent is subject to a terminal disclaimer.

(21) Appl. No.: 12/812,878

(22) PCT Filed: Jan. 16, 2009

(86) PCT No.: PCT/JP2009/050586
§ 371 (c)(1),
(2), (4) Date: Sep. 13, 2010

(87) PCT Pub. No.: WO2009/091049
PCT Pub. Date: Jul. 23, 2009

(65) Prior Publication Data
US 2011/0052935 A1    Mar. 3, 2011

(30) Foreign Application Priority Data

Jan. 17, 2008 (JP) ................... 2008-007569
Apr. 8, 2008 (JP) ................... 2008-100411
Jan. 15, 2009 (JP) ................... 2009-006437

(51) Int. Cl.
*B32B 15/18* (2006.01)
*B23K 20/18* (2006.01)

(52) U.S. Cl.
USPC ........... 428/649; 428/653; 428/642; 228/208; 228/209; 228/254; 228/262.5

(58) Field of Classification Search
None
See application file for complete search history.

(56) References Cited

U.S. PATENT DOCUMENTS 3,066,392 A * 12/1962 Kanter et al. ............... 428/649
5,599,467 A * 2/1997 Okabe et al. ............... 219/118

(Continued)

FOREIGN PATENT DOCUMENTS

CN        1978119 A       6/2007
CN      101043968 A       9/2007

(Continued)

OTHER PUBLICATIONS

"Aluminum and Aluminum Alloy Sheets and Plates, Strips, and Coiled Sheets", JIS (Japanese Industrial Standard) H 4000, 1999, pp. 829-903.

(Continued)

*Primary Examiner* — John J Zimmerman
(74) *Attorney, Agent, or Firm* — Foley & Lardner LLP

(57) ABSTRACT

In joining a magnesium alloy material 1 (first material) and a steel material (second material), a zinc-plated steel plate 2 plated with zinc (metal C) is used as a steel material, Al (metal D) is added to the magnesium alloy material 1. Next, eutectic melting of Mg and Zn is caused so as to remove a product produced by the eutectic melting with an oxide film 1*f* and impurities from a joint interface. Moreover, an Al—Mg system intermetallic compound such as $Al_3Mg_2$ and an Fe—Al system intermetallic compound such as $FeAl_3$ are produced, whereby regenerated surfaces of both materials 1 and 2 are joined via a compound layer 3 containing those intermetallic compounds.

15 Claims, 16 Drawing Sheets

U.S. PATENT DOCUMENTS

| | | | |
|---|---|---|---|
| 7,850,059 B2 * | 12/2010 | Kobayashi et al. | 228/178 |
| 7,935,908 B2 | 5/2011 | Nakagawa et al. | |
| 7,984,840 B2 * | 7/2011 | Kobayashi et al. | 228/178 |
| 8,020,749 B2 * | 9/2011 | Kobayashi et al. | 228/178 |
| 8,058,584 B2 * | 11/2011 | Miyamoto et al. | 219/118 |
| 2004/0048096 A1 | 3/2004 | Doh et al. | |
| 2004/0262269 A1 | 12/2004 | Matile | |
| 2006/0150387 A1 | 7/2006 | Kobayashi et al. | |
| 2008/0026247 A1 * | 1/2008 | Nakagawa et al. | 428/649 |
| 2008/0241572 A1 * | 10/2008 | Miyamoto et al. | 428/600 |
| 2009/0050608 A1 | 2/2009 | Hayashi et al. | |
| 2011/0123825 A1 * | 5/2011 | Sakurai et al. | 428/650 |
| 2011/0159313 A1 * | 6/2011 | Kasukawa et al. | 428/649 |

FOREIGN PATENT DOCUMENTS

| | | | |
|---|---|---|---|
| EP | 2253410 A1 | | 11/2010 |
| JP | 59-225893 A | | 12/1984 |
| JP | 01-154886 A | | 6/1989 |
| JP | 04-127973 A | | 4/1992 |
| JP | 4-143083 | * | 5/1992 |
| JP | 04-251676 A | | 9/1992 |
| JP | 05-065272 B2 | | 9/1993 |
| JP | 06-039558 A | | 2/1994 |
| JP | 07-155964 A | | 6/1995 |
| JP | 09-122924 A | | 5/1997 |
| JP | 2000-272541 A | | 10/2000 |
| JP | 2001-252777 A | | 9/2001 |
| JP | 2002-241962 A | | 8/2002 |
| JP | 3335036 B2 | | 8/2002 |
| JP | 2004-122171 A | | 4/2004 |
| JP | 2004-195493 A | | 7/2004 |
| JP | 2006-175502 A | | 7/2006 |
| JP | 2006-198679 | * | 8/2006 |
| JP | 2006-231343 A | | 9/2006 |
| JP | 2006-326613 A | | 12/2006 |
| JP | 2007-105737 A | | 4/2007 |
| JP | 2007-130686 A | | 5/2007 |
| JP | 2007-326146 A | | 12/2007 |
| JP | 2007-330973 A | | 12/2007 |
| JP | 2008-6465 A | | 1/2008 |
| JP | 2008-23583 A | | 2/2008 |
| JP | 2009-279605 | * | 12/2009 |
| WO | WO-03/022511 A1 | | 3/2003 |
| WO | WO-2006/046608 A1 | | 4/2006 |
| WO | WO-2009/091049 A1 | | 7/2009 |

OTHER PUBLICATIONS

"Cold-reduced Carbon Steel Sheets and Strip", JIS (Japanese Industrial Standard) G 3141, 1996, pp. 291-314.

"Hot-dip Zinc-coated Steel Sheets and Coils", JIS (Japanese Industrial Standard) G 3302, 1998, pp. 315-365.

"Specimen Dimensions and Procedure for Shear Testing Resistance Spot and Embossed Projection Welded Joints", JIS (Japanese Industrial Standard) Z 3136, 1999, pp. 786-791.

M. Fujii et al., "YAG Laser Welding of Dissimilar Metal (Aluminum Alloy and Mild Steel)", Preprints of National Meeting of Japan Welding Society, vol. 61, 1997, pp. 380-381.

USPTO Office Action, U.S. Appl. No. 13/061,190, (with 2011/0052935), Oct. 17, 2012, 11 pages.

USPTO Office Action, U.S. Appl. No. 13/061,190, May 7, 2013, 14 pages.

* cited by examiner (A)

(B)

(C)

(D)

(E)

(A) — FeAl₃

(B) — Al₃Mg₂+FeAl₃

(C) — FeAl₃

(A)

(B)

(C)

JOINING METHOD AND JOINT STRUCTURE OF DISSIMILAR METAL

TECHNICAL FIELD

The present invention relates to a method of jointing dissimilar metals, such as a combination of a steel material and a magnesium alloy material, in which an oxide film is present in a joint surface therebetween and it is metallurgically difficult to join the materials directly, and relates to a joint structure of the dissimilar metals jointed by the method.

BACKGROUND ART

When joining dissimilar metals, such as a combination of a steel material and a magnesium alloy material, an oxide film is present on a surface of the magnesium alloy material. Moreover, when using a material in which an oxide film on a surface of steel is grown in a heating process at joining, it is difficult to joint the materials in an atmosphere.

Furthermore, an Fe—Mg binary phase diagram shows a biphasic separation, and each solid solubility limit is significantly small. As a result, it is metallurgically quite difficult to directly join the materials having such characteristics.

Conventionally, when using such dissimilar metal materials composed of a combination of the magnesium material and steel, a mechanical joint method using such as a bolt and a rivet has been employed (refer to Parent Citation 1).

Patent Citation 1: Japanese Patent Unexamined Publication No. 2000-272541

DISCLOSURE OF INVENTION

Technical Problem

However, in the method described in Patent Citation 1, there was a problem in increasing weights of joint members and costs since the number of members to be used in joining was increased.

The present invention has been made focusing on the above-described problems in joining dissimilar metals in the conventional art. An object of the present invention is to provide a joining method capable of strongly joining dissimilar metals even if the metals are materials metallurgically difficult to be joined directly such as a magnesium material and steel. In addition, another object of the present invention is to provide a joint structure capable of strongly joining the dissimilar metals even composed of a combination of the above-described materials.

Solution to Problem

As a result of repeated assiduous studies by the inventors to achieve the above-mentioned objects, it was found that an oxide film formed on a surface between dissimilar metallic materials to be joined could be removed from a joint interface at relatively low temperature by interposing a third material between the dissimilar metallic materials to be joined, and causing a eutectic reaction between the third material and at least one of the dissimilar metallic materials. According to a further research and development, the above-mentioned problem could be solved by adding metal forming an intermetallic compound to at least one of the dissimilar metallic materials, and interposing a layer containing the intermetallic compound between the dissimilar metallic materials. Accordingly, the present invention was completed.

The present invention is based on the above-described findings. The method of joining dissimilar metals according to the present invention is characterized by: interposing a third material containing a metal C between a first material containing magnesium as a main component and a second material containing iron as a main component; and causing eutectic melting between the metal C and at least one of magnesium and iron. A metal D is preliminarily added to the third material and/or a material mainly containing metal that causes the eutectic melting with the metal C. In joining, an eutectic melting reaction product is removed from a joint interface, whereby the first material and the second material are joined via a compound layer including an intermetallic compound containing the metal D and at least one of magnesium and iron.

In addition, the joint structure of dissimilar metals according to the present invention is characterized in that regenerated surfaces of a first material containing magnesium as a main component and a second material containing iron as a main component are joined via a compound layer including an intermetallic compound containing a metal D and one or both of magnesium and iron.

Advantageous Effects of Invention

According to the present invention, it is possible to easily remove the oxide film at low temperature from the joint interface even when the oxide film is formed on the joint interface, by interposing the third material between the dissimilar metals to be joined and causing eutectic melting between the third material and at least one of the materials to be joined. In addition, it is possible to mutually diffuse the materials to be joined on the joint interface even composed of the combination of the materials metallurgically difficult to be joined directly, by interposing the layer containing the intermetallic compound of the metal D and at least one of the materials to be joined, thereby achieving a strong joint.

BEST MODE FOR CARRYING OUT THE INVENTION

Figure 1:
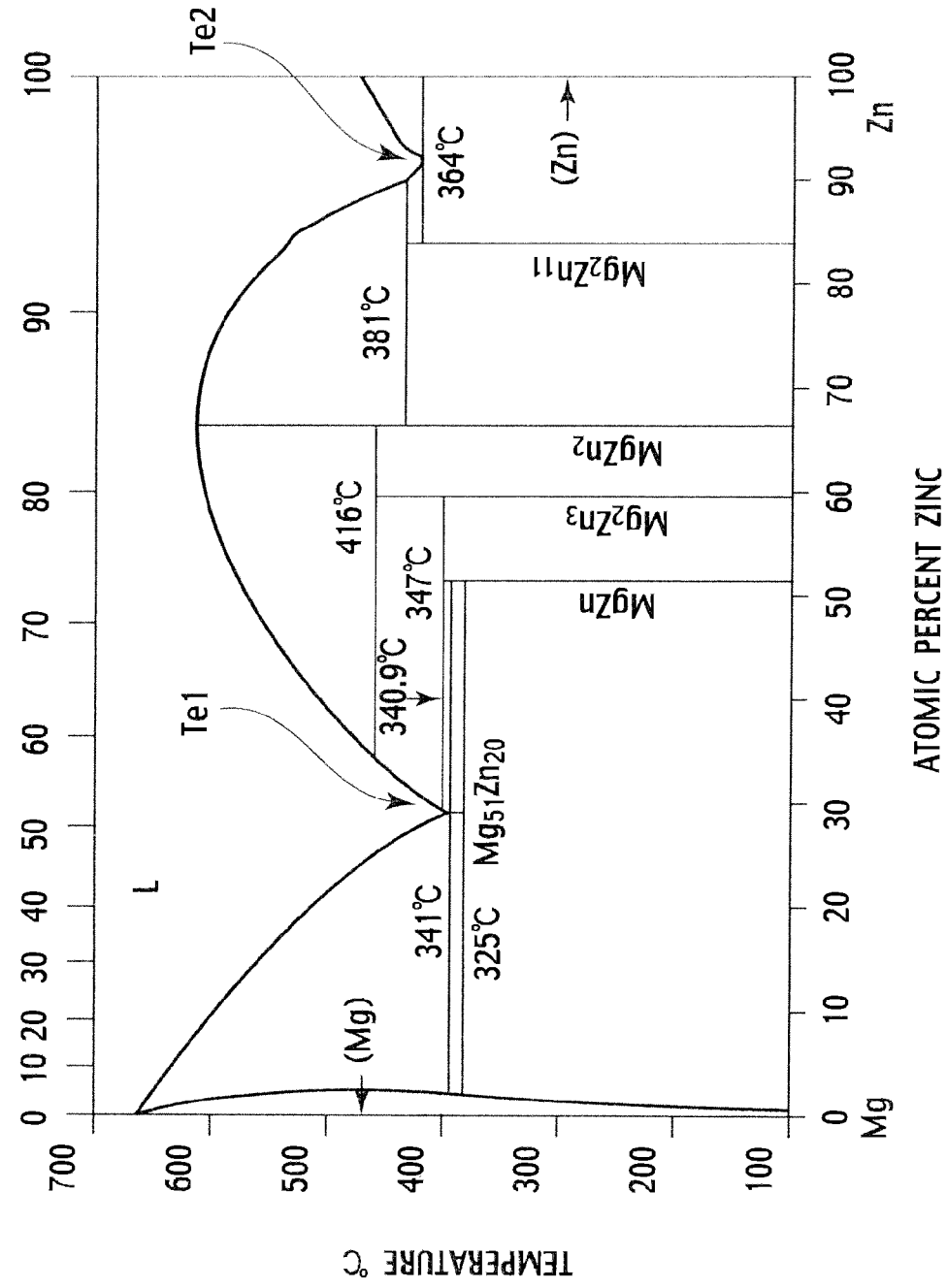
FIG. 1 is a graph showing eutectic points in a binary phase diagram of Mg—Zn system.
Figure 2:
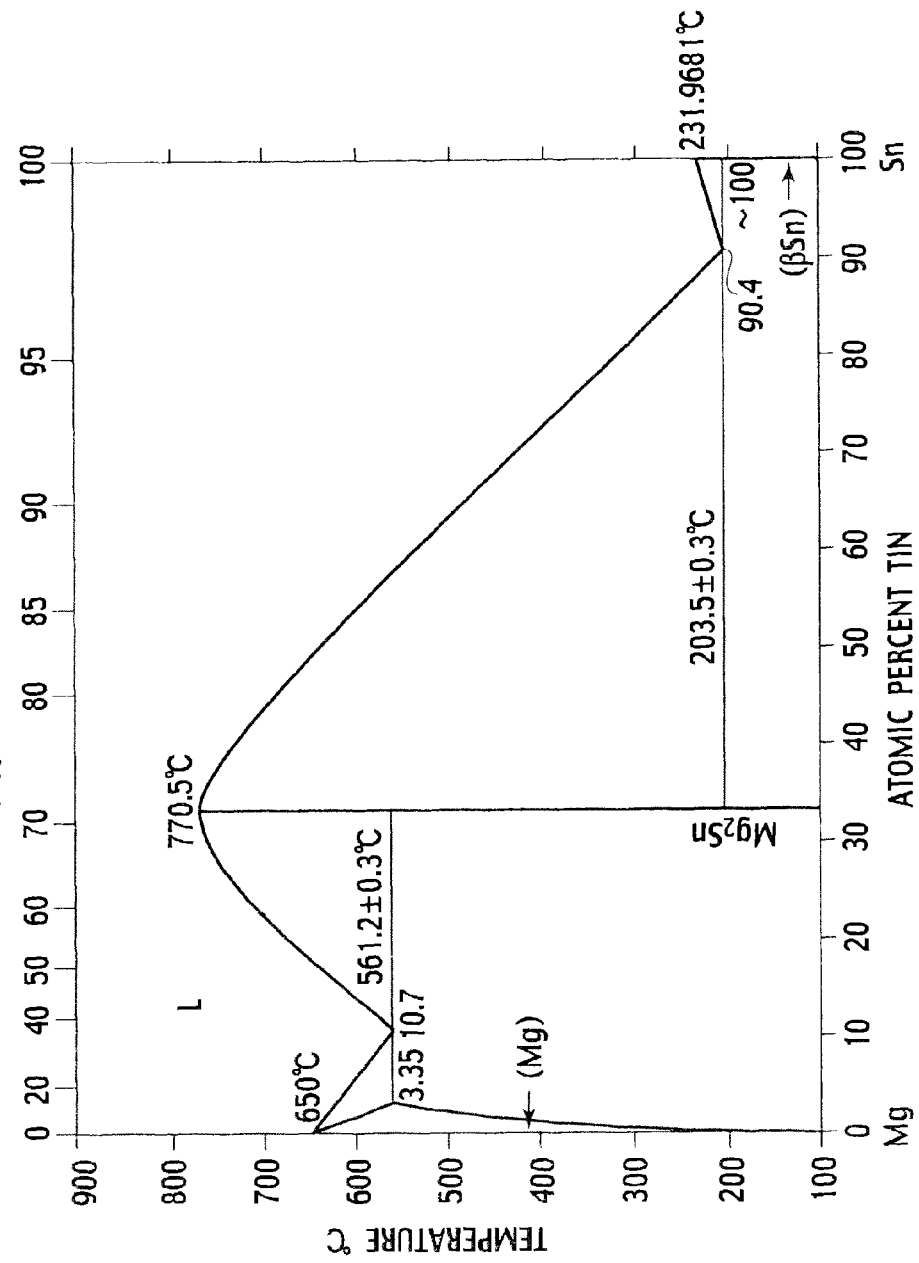
FIG. 2 is a binary phase diagram of Mg—Sn system.
Figure 3:
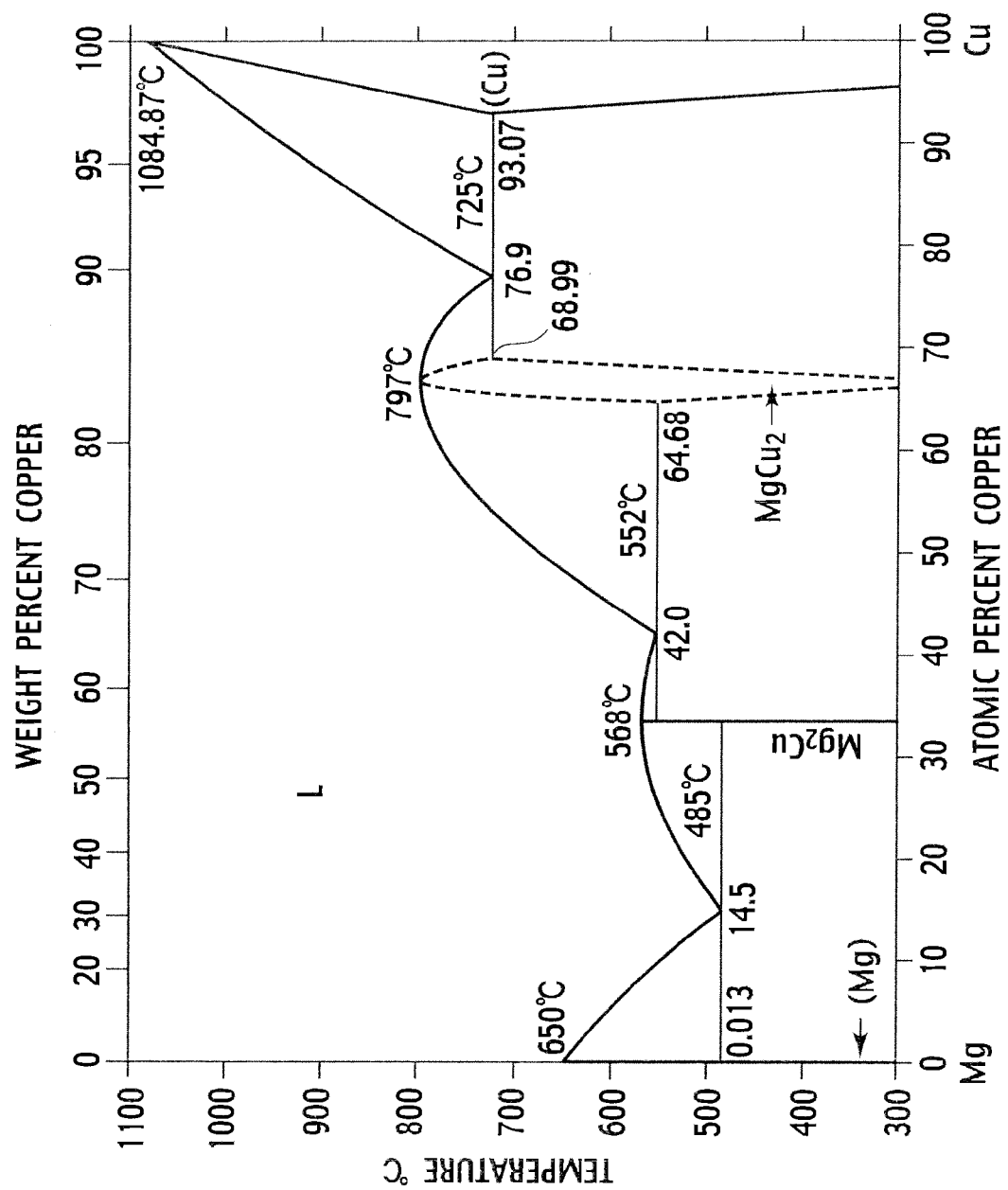
FIG. 3 is a binary phase diagram of Mg—Cu system.
Figure 4:
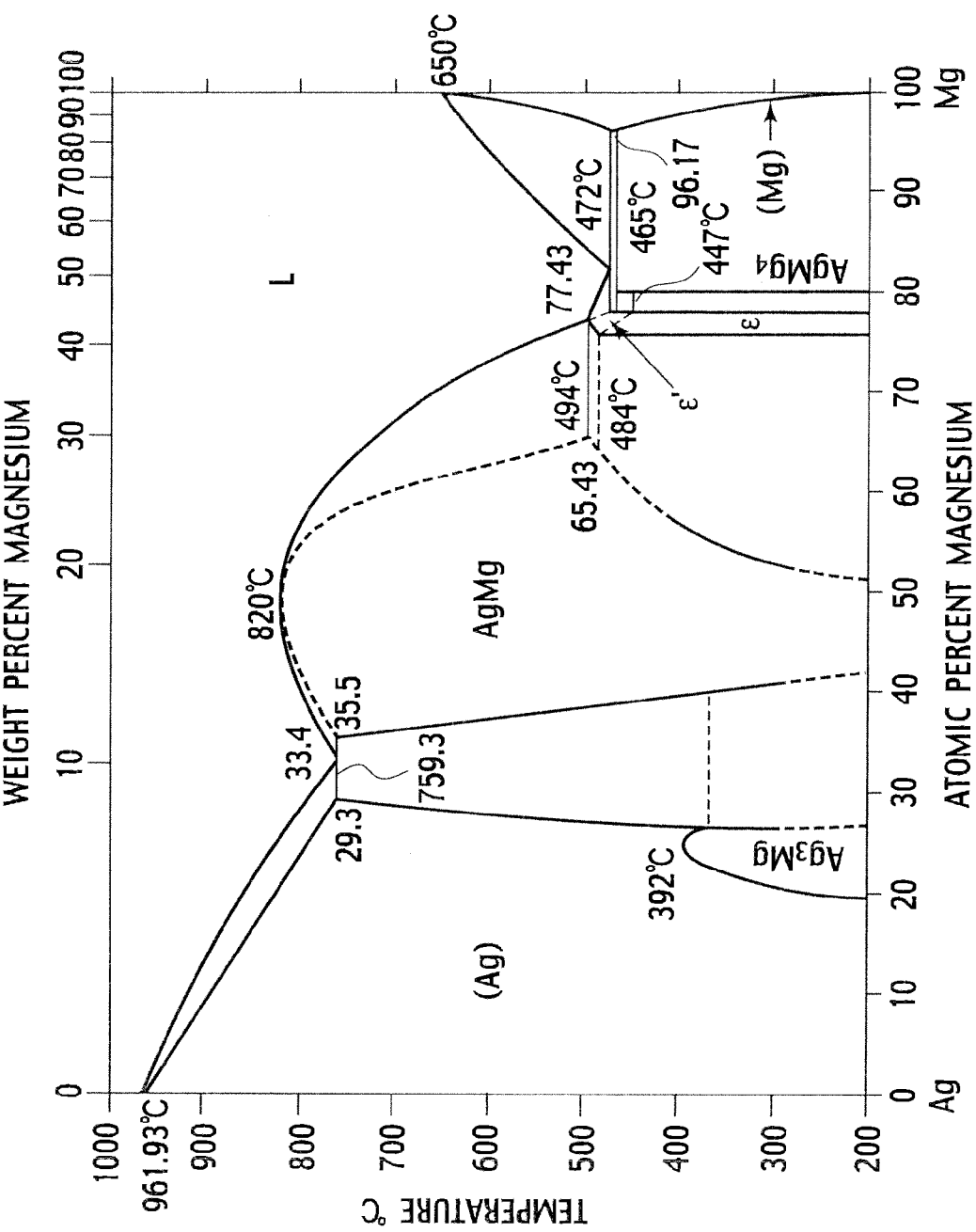
FIG. 4 is a binary phase diagram of Ag—Mg system.
Figure 5:
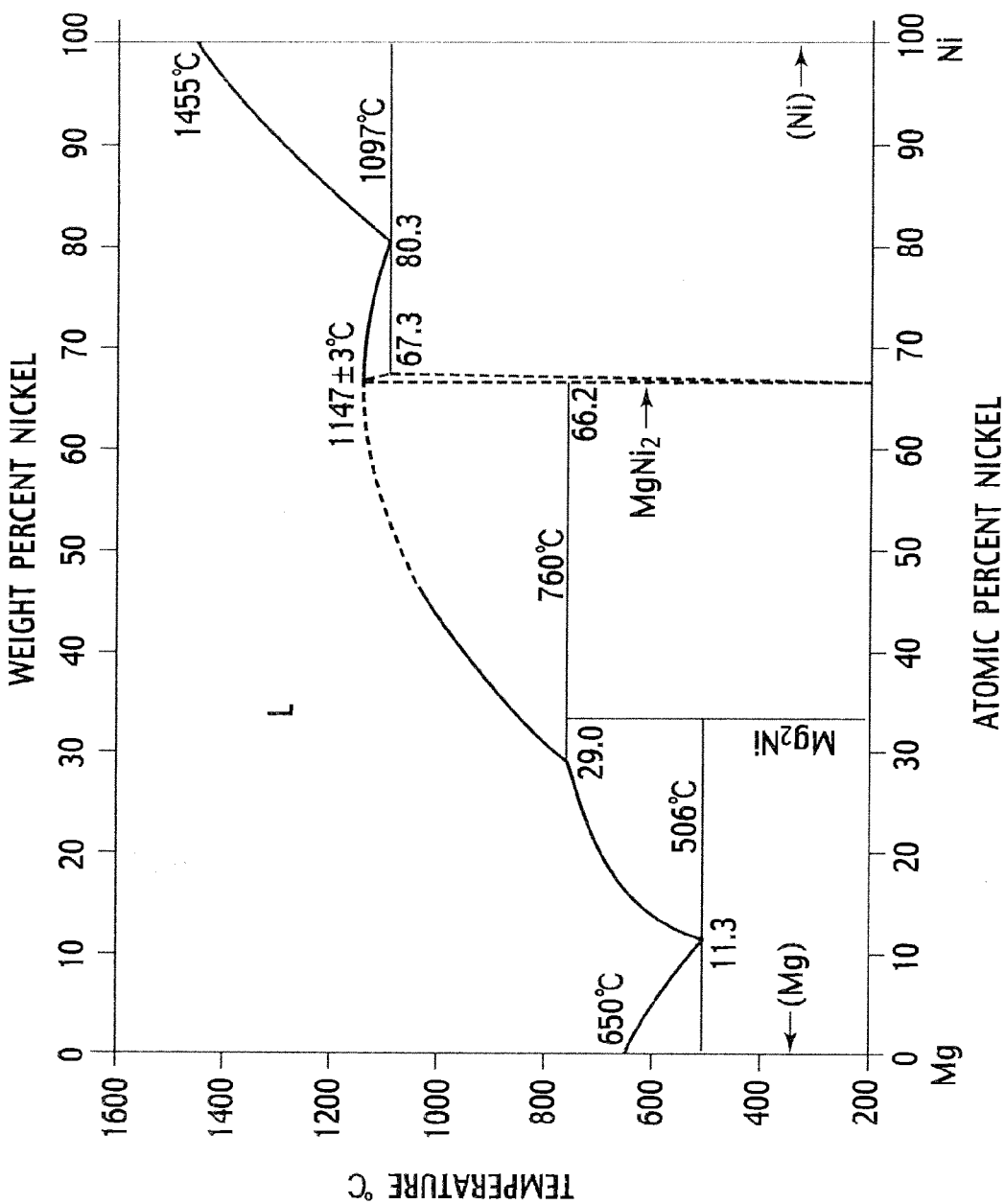
FIG. 5 is a binary phase diagram of Mg—Ni system.

A description will be made below in detail of a method of joining dissimilar metals, and a joint structure obtained thereby according to the present invention. Note that, in this description. "%" represents a mass percentage unless otherwise specified.

In the method of joining the dissimilar metals according to the present invention, when a first material (magnesium as a main component) and a second material (iron as a main component) are joined, a third material containing a metal C that causes eutectic melting with one of or both of magnesium and iron is first interposed between the first material and the second material, as described above. Meanwhile, a metal D is preliminarily added to one of or both of the third material and a material mainly containing the metal that causes the eutectic melting with the metal C.

With regard to the joint, the eutectic melting is caused with the metal C and magnesium and/or iron by heating and applying pressure, a product by the eutectic melting is removed from a joint interface, and an intermetallic compound is generated between magnesium and the metal D and/or between iron and the metal D, whereby the first material and the second material are joined via a compound layer containing the intermetallic compound.

Thus, an oxide film on a surface of the material to be joined can be easily moved since a portion adjacent to the joint interface is melted due to the eutectic melting at a lower temperature than a melting point of the material to be joined. In addition, the oxide film that is a factor to inhibit joining can be easily moved from the joint interface to the periphery, so as to easily eliminate the oxide film. Moreover, the layer containing the intermetallic compound is present on the joint interface. Therefore, it is possible to mutually diffuse the materials to be joined even composed of the combination of the materials metallurgically difficult to be joined directly, thereby improving a joint intensity.

When the metal C causes the eutectic melting with both of magnesium and iron, it is enough to add the metal D to either the first material or the second material, although the metal D may be added to both of the first and second materials. When the metal D is added to the third material, it is obviously not necessary to add the metal D to neither the first material nor the second material although the metal D may be added to one of or both of the first and second materials.

Note that, the "main component" in the present invention represents the component that is contained most in the material.

The "metal C" represents the metal that causes the eutectic melting with one of or both of magnesium and iron, and the "metal D" represents the metal that composes the intermetallic compound with one of or both of magnesium and iron.

A specific combination of the dissimilar metal materials of the present invention, that is, a specific example of the first material and the second material can include the combination of a magnesium material and steel as described above. In this case, aluminum can be appropriately employed as the metal D. As for the metal D, gallium (Ga) other than aluminum of practical metal can be employed.

With regard to the specific joining method, the third material containing the metal C causing the eutectic melting with magnesium is preliminarily adhered to the joint surface of a steel material, and aluminum as the metal D is added to one of or both of the magnesium material and the third material. Then, the eutectic melting of aluminum an the metal is caused by heating and applying pressure at joining, the oxide film of magnesium is removed with the product produced by the melting reaction from the joint interface, and an Al—Mg intermetallic compound and an Fe—Al intermetallic compound are produced, whereby the magnesium material and the steel material can be joined via the compound layer containing the intermetallic compounds.

In such a case, the meta C is not limited to a specific metal as long as it causes the eutectic melting with magnesium. For example, metal including any one of zinc (Zn), tin (Sn), copper (Cu), silver (Ag) and nickel (Ni), or two or more thereof can be employed as the third material.

Namely, as can be seen from the binary phase diagrams shown in FIGS. 1 to 5, an Mg—Zn system alloy has two eutectic points at 341° C. and 364° C., and an Mg—Sn system alloy has two eutectic points at 561° C. and 204° C., respectively. In addition, it is known that an Mg—Cu system alloy has eutectic points at 485° C. and 552° C., an Mg—Ag system alloy has an eutectic point at 472° C., and an Mg—Ni system alloy has an eutectic point at 506° C., respectively, in which the respective eutectic points are lower than a melting point of Mg.

As described above, aluminum or gallium as the metal D can be added to the third material containing the metal C. Specifically, an alloy containing Zn as the metal C and Al as the metal D is preferably employed as the third material. Accordingly, such a material can easily deal with the joint of the magnesium material that substantially does not contain Al.

With regard to the specific means of adhering the metal C and the third material containing the metal D and the metal C preliminarily to the joint surface of the steel material, a coating means such as plating, thermal spraying, vapor deposition and film coating is preferably adopted.

In other words, the third material is adhered to a cleaned surface after cleaning by the above-mentioned coating means. As a result, after a covering layer melted by the eutectic reaction at joining is removed to the periphery of the joint portion with the oxide film and impurities on the surface, a strong joint can be achieved since a quite clean regenerated surface is emerged from under the covering layer.

In this case, as for the steel plate covered with the third material, a material of which a surface is preliminarily plated with zinc forming low-melting-point eutectic with magnesium as a main components of the first material, such as a zinc-plated steel plate standardized according to JIS G 3302 and JIS G 3313, can be used. Due to the zinc-plated steel plate, any additional preparation such as newly plating on the steel material is not required. In addition, a commercially available common plated steel material on which zinc is plated in order to prevent corrosion can be directly employed. Accordingly, it is possible to achieve a strong joint between the dissimilar metals quite simply and inexpensively.

Alternatively, an Al—Zn alloy-plated steel plate containing aluminum in zinc plating can be used, in which aluminum functions as the metal D to form the intermetallic compound with Mg and Fe.

In this case, the contained amount of Al in the plated layer is preferably less than 65%, more preferably 5% or more to less than 60% by mass. Namely, when the Al amount in the Al—Zn alloy-plated layer is 65% or more, the thickness of the compound layer formed on the joint interface becomes thicker relatively. Moreover, the compound structure becomes a dominant constitution of the Fe—Al intermetallic compound, or has a two-layered structure instead of the composite structure in which the Fe—Al intermetallic compound and the Al—Mg intermetallic compound are mixed. As a result, the joint intensity tends to be lowered.

Note that, the alloy-plated steel plate plated with the Al—Zn alloy on the surface of the steel plate is standardized according to JIS G 3317 (Zn-5% Al) and JIS G 3321 (55% Al—Zn). Thus, it is possible to adopt such a commercially available plated steel material, and therefore, possible to achieve a strong joint between the dissimilar metals simply and inexpensively.

With regard to the method of joining the dissimilar metals according to the present invention, the first material (magnesium as a main component) and the second material (iron as a main component) are joined via the compound layer containing the intermetallic compound of magnesium and the metal D or the intermetallic compound of iron and the metal D, as described above. Therefore, such a joint is achieved when at least any one of the intermetallic compounds is contained in the compound layer. However, in view of further improving the joint intensity, both of the Al—Mg intermetallic compound and the Fe—Al intermetallic compound are produced, and both are preferably mixed in the compound layer.

With regard to the example employing aluminum as the metal D in the joint of the magnesium material and steel as described above, the compound layer including a composite structure is preferable, in which the Al—Mg intermetallic compound such as $Al_3Mg_2$ and the Fe—Al intermetallic compound such as $FeAl_3$ are mixed.

Next, the example employing the Mg—Zn alloy in the eutectic melting will be explained.

As previously shown in FIG. 1, the Mg—Zn system has the two eutectic points (Te1 and Te2) at 341° C. and 364° C., respectively, which are much lower temperatures than the melting point of magnesium of 650° C., and at which the eutectic reaction is caused.

Therefore, the eutectic melting of Mg and Zn is provided by use of the eutectic points shown in the figure, so as to utilize in the oxide film removal at joining. Accordingly, it is possible to remove the oxide film of magnesium inhibiting joining effectively at low temperature. In addition, it is possible to maintain the interface temperature at joining uniformly, so as to achieve a stable joint.

Note that, the eutectic melting represents the melting utilizing the eutectic reaction. When the composition in a mutually diffused area generated by mutually diffusing the two types of metal (or alloy) becomes an eutectic composition, a liquid phase is formed due to the eutectic reaction if the maintained temperature is the eutectic temperature or more.

Therefore, the cleaned surfaces of both metals are brought into contact with one another, followed by heating to and maintaining at the eutectic temperature or more, thereby causing the reaction. This represents the eutectic melting. It is not necessary to control the composition since the eutectic composition is spontaneously obtained due to the mutual diffusion.

FIGS. 6(A) to 6(E) are schematic process charts showing a joint process between the magnesium alloy material (the first material: Mg as a main component) and the zinc-plated steel plate (the second material: Fe as a main component) as a specific example of the joint process of the dissimilar metal panels according to the present invention.

Figure 6:
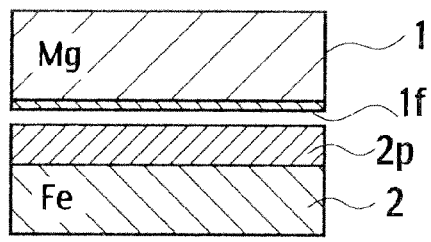
FIG. 6 is a process chart schematically showing a joint process in a method of joining dissimilar metals according to the present invention.
Figure 6:
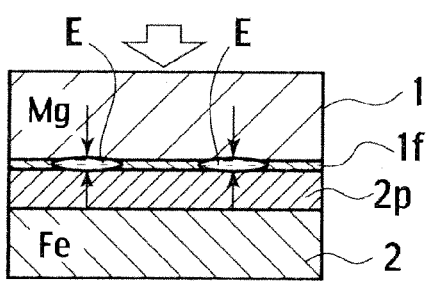
Figure 6:
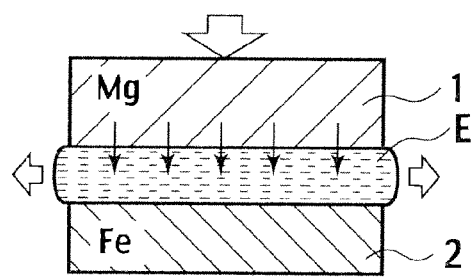
Figure 6:
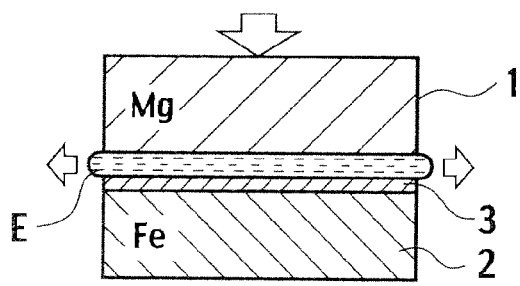
Figure 6:
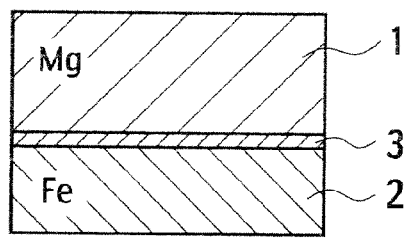

First, as shown in FIG. 6(A), a zinc-plated steel plate 2 provided with a zinc-plated layer (the third material) 2p containing zinc functioning as the metal C to form eutectic with Mg on the surface at least at the joint interface side, and a magnesium alloy material 1 are prepared. Then, as shown in FIG. 6(B), the zinc-plated steel plate 2 and the magnesium alloy material 1 are overlapped one another by interposing the zinc-plated layer 2p therebetween. Note that, the appropriate amount of aluminum (the metal D) is preliminarily added to the magnesium alloy material 1. In addition, an oxide film 1f is generated on a surface of the magnesium alloy material 1.

Then, as shown by arrows in FIG. 6(B), the oxide film 1f is locally damaged caused by relative pressing force and plastic deformation due to a thermal impact load and heating.

When the oxide film 1f is locally damaged as described above, Mg and Zn locally come in contact with one another. By maintaining a predetermined high-temperature state, the eutectic melting of Mg and Zn is caused starting from the contacting portions, whereby an eutectic melting reaction product E is produced. Moreover, as shown in FIG. 6(C), the area in which the eutectic melting reaction product E is produced is expanded to the whole area of the joint interface, thereby sequentially eliminating the oxide film 1f on the surface of the magnesium alloy material 1 effectively.

Then, as shown in FIG. 6(D), the oxide film 1f and impurities (not shown) on the joint interface are removed with the eutectic melting reaction product E to the periphery of the joint portion by applying pressure. In this point, Mg is preferentially melted with Zn due to the eutectic melting on the joint interface, thereby removing to the periphery of the joint interface. As a result, the Al component added in the magnesium alloy is left on the joint interface. Accordingly, an Al-rich phase is relatively provided only on the joint interface. In addition, Al atoms thereof react with Fe of the zinc-plated steel plate 2 and Mg of the magnesium alloy material 1, so as to form a compound layer 3 (a reaction layer) containing Al—Mg system and Fe—Al system intermetallic compounds on the joint interface.

Moreover, after the elapse of joint time, as shown in FIG. 6(E), the Mg—Zn eutectic melting reaction product is completely removed to the periphery of the joint interface. As a result, the magnesium alloy material 1 and the steel plate portion of the zinc-plated steel plate 2 are strongly joined via the compound layer 3 containing the intermetallic compounds as descried above on the joint interface. Thus, the joint process is completed.

As illustrated in the figures, the zinc-plated layer 2p is not left on the joint interface after joining, while the magnesium alloy material 1 and the steel plate portion of the zinc-plated steel plate 2 are joined only via the compound layer 3. This is one of the factors capable of achieving a strong joint between the magnesium alloy material 1 and the zinc-plated steel plate 2. It is necessary in such a joint structure that predetermined pressing force, temperature and time necessary for the eutectic reaction and removal of the eutectic melting reaction product E, and an initial thickness of the zinc-plated layer 2p of the zinc-plated steel plate 2 correspond to the amount of zinc consumed by the eutectic reaction at joining.

Figure 7:
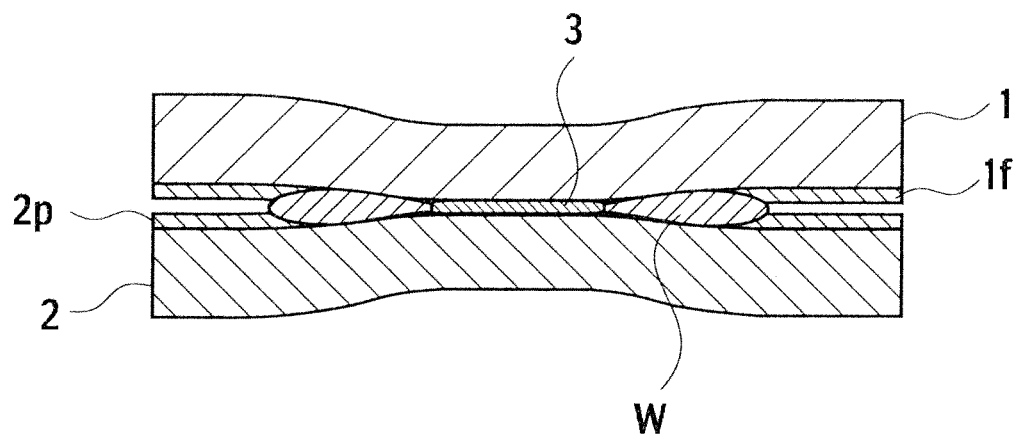
FIG. 7 is a schematic cross-sectional view showing a joint structure of a lap joint by a point joining adopting a joining method of the present invention.
Figure 8:
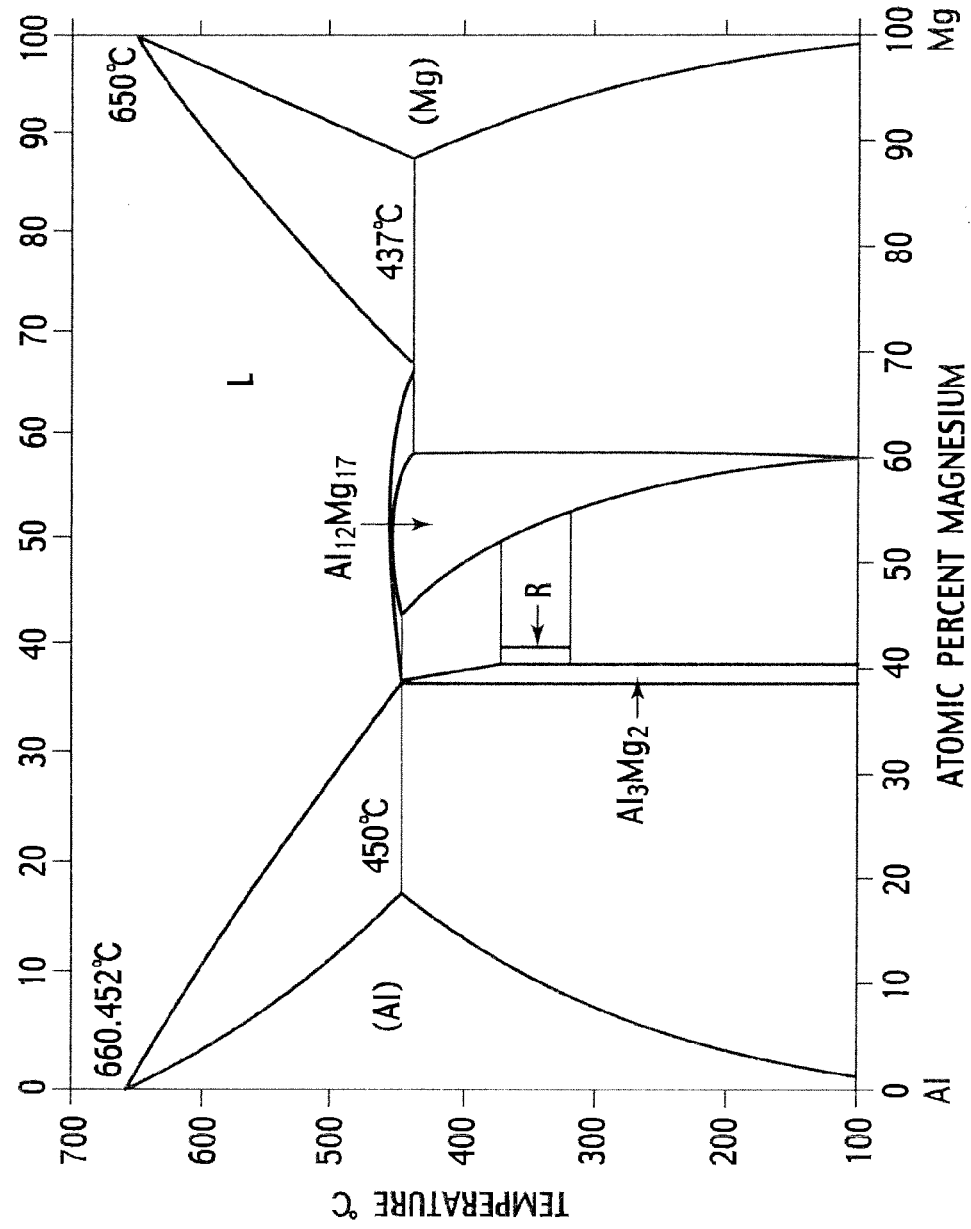
FIG. 8 is a binary phase diagram of Al—Mg system.
Figure 9:
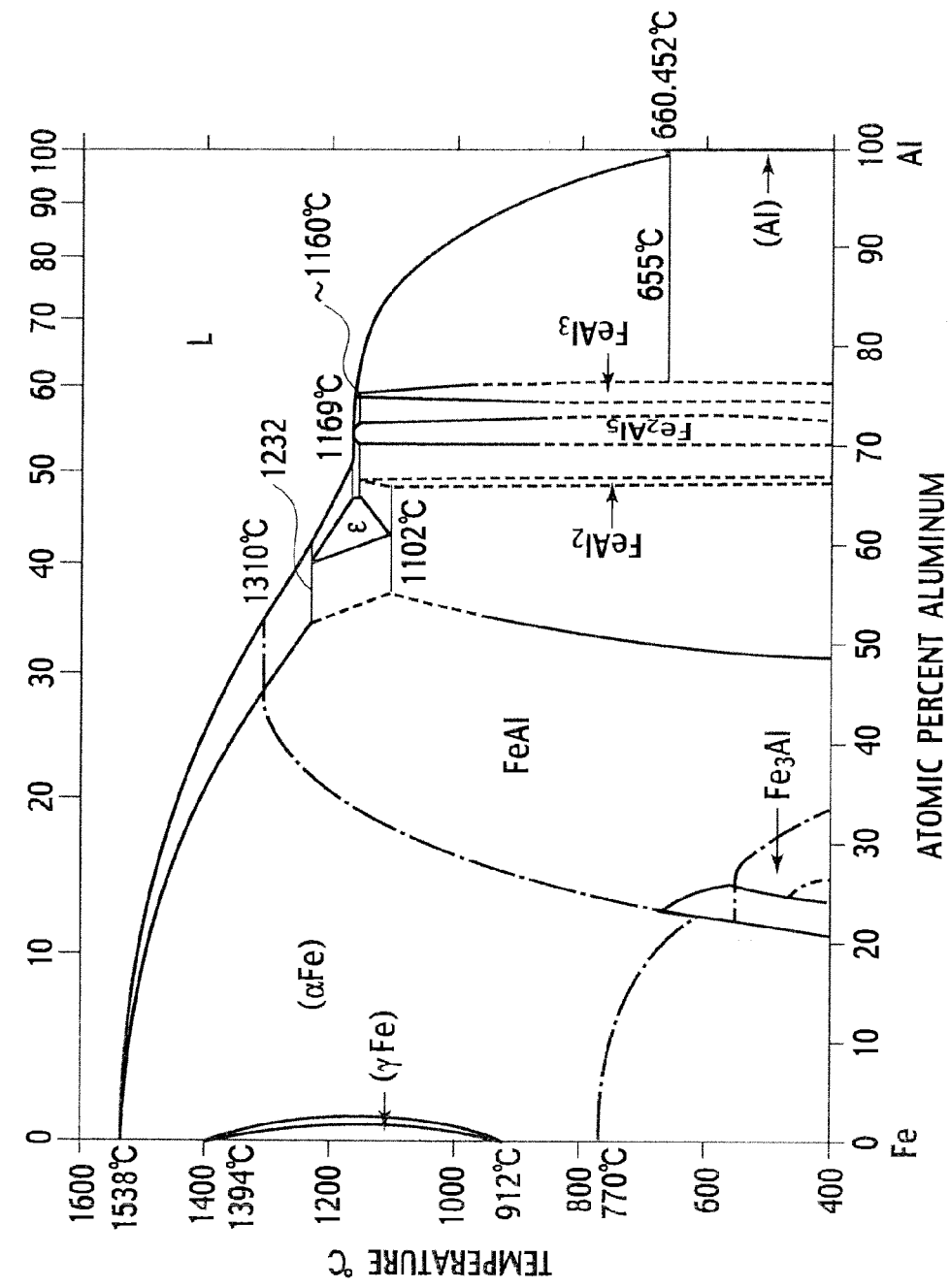
FIG. 9 is a binary phase diagram of Fe—Al system.
Figure 10:
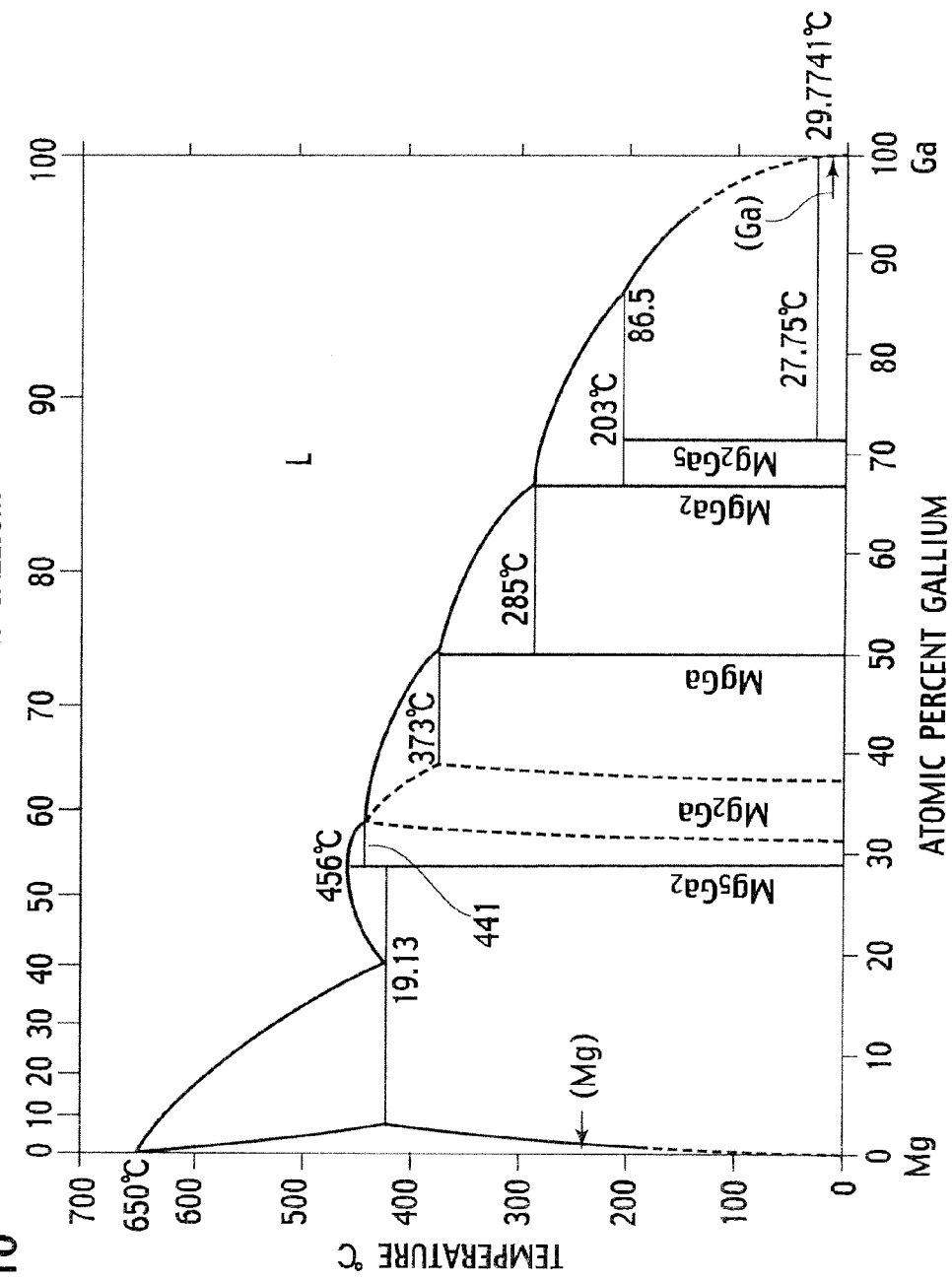
FIG. 10 is a binary phase diagram of Mg—Ga system.
Figure 11:
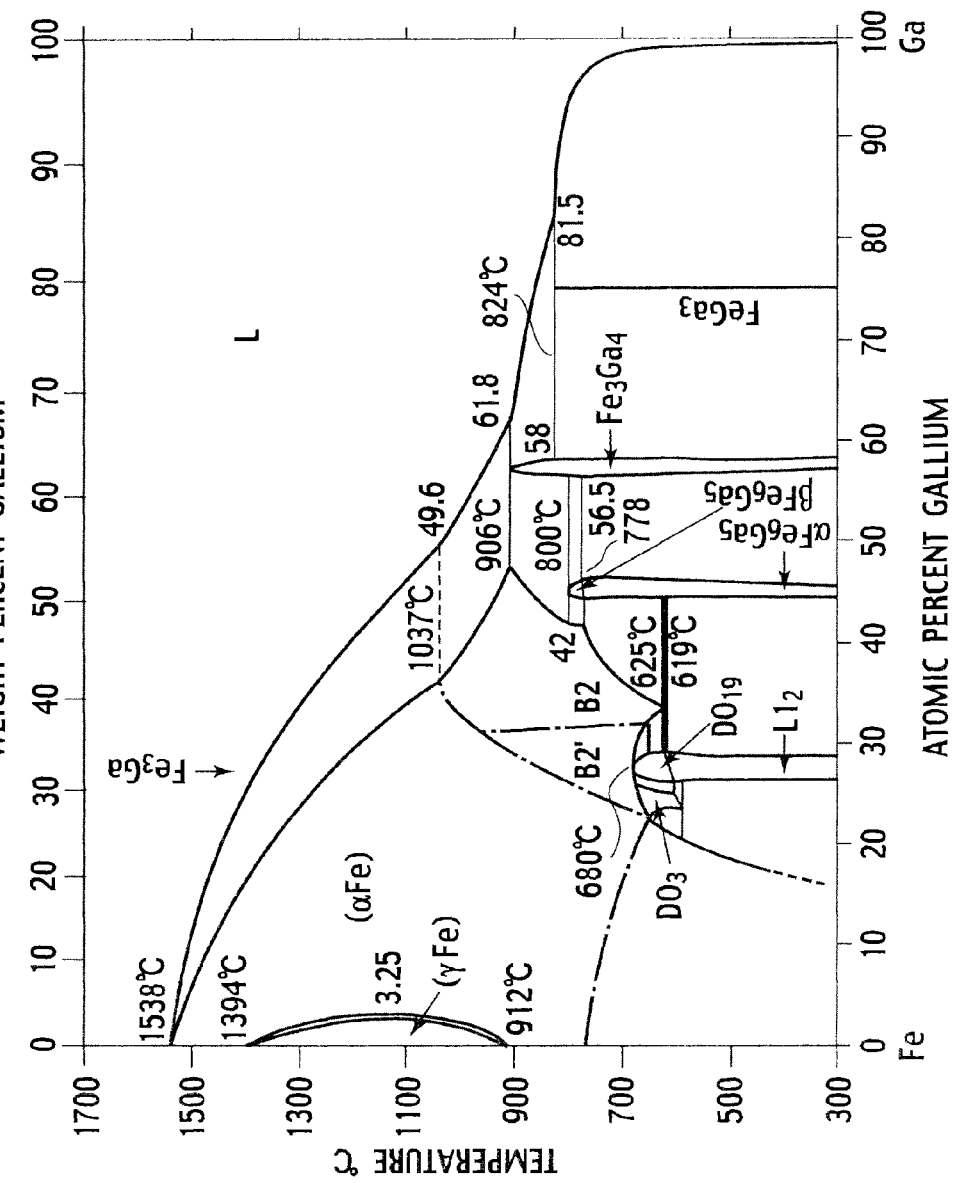
FIG. 11 is a binary phase diagram of Fe—Ga system.

FIG. 7 shows the joint portion structure by a practical point joining adopting the above-described method. The magnesium alloy material 1 in which the oxide film 1f is produced on the surface thereof is deposited on the zinc-plated steel plate 2 provided with the zinc-plated layer 2p as the metal C on the surface thereof at least at the joint interface side.

In addition, the compound layer 3 containing the Al—Mg intermetallic compound (such as $Al_3Mg_2$) and the Fe—Al intermetallic compound (such as $FeAl_3$) is formed on the joint interface as described above. As a result, the magnesium alloy material 1 and the steel plate 2 are joined via the compound layer 3. Moreover, effluents W, which are provided due to the removal of oxide derived from the oxide film 1f and impurities on the joint interface with the eutectic melting product containing zinc 2p of the zinc-plated steel plate 2, are interposed between both plate materials 1 and 2 while surrounding the joint portion.

In the above-described example, the metal C and the metal D employ Zn and Al, respectively. As described above, the metal C can employ Sn, Cu, Ag and Ni instead of Zn, and the metal D can employ Ga instead of Al. Even when those metals are employed instead of Zn and Al, a joining principle and effects are basically not different from the case employing Zn and Al, although the eutectic temperature and the intermetallic compound to be produced vary depending on the types of the metal C and the metal D.

FIGS. 8 to 11 shows the binary phase diagrams of the Al—Mg system, the Al—Fe system, the Mg—Ga system and the Fe—Ga system. As can be seen from the figures, the intermetallic compound such as $Al_3Mg_2$ is produced in the Al—Mg system, the intermetallic compound such as $FeAl_3$ is produced in the Al—Fe system, the intermetallic compound such as $MgGa_2$ is produced in the Mg—Ga system, and the intermetallic compound such as $FeGa_3$ is produced in the Fe—Ga system, respectively.

As for the joining means (heating means) applied to the dissimilar metal joining method, it is particularly not limited to a specific method as long as it can control the temperature of the joint interface precisely. For example, a commonly-used device and equipment can be employed, including fusion joining such as resistance spot welding, laser welding and high-frequency welding, and solid-phase welding such as friction stir welding, ultrasonic joining and diffusion joining. Therefore, the joining method of the present invention is not costly since the existing equipments can be utilized without newly developing and preparing joining means and heat sources for the joining method.

The joint structure of the dissimilar metals according to the present invention is a joint structure of the respective regenerated surfaces of the first material (main component: magnesium) and the second material (main component: iron) via the compound layer 3 containing the intermetallic compound of iron and the metal D. The joint structure can be obtained by the above-described joining means according to the present invention.

For example, in the lap joint as shown in FIG. 7, the effluents W, which include the eutectic melting reaction product formed of the metal C and at least one of magnesium of the magnesium alloy material 1 and iron of the zinc-plated steel plate 2, and oxide derived from the oxide film, are removed to the periphery of the compound layer 3 as a joint portion, and interposed between both plate materials 1 and 2. The effluents W may include impurities on the joint interface, components contained in the materials to be joined, and a redundant metal C.

Alternatively, with regard to a butt joint, it is possible to eliminate the effluents W, which are removed to the periphery from the joint interface, from the joint members completely.

When the first material is the magnesium material (main component: Mg), the second material is the steel material (main component: Fe), and the metal D is aluminum, the respective regenerated surfaces of the magnesium material and the steel material are joined via the compound layer containing the Al—Mg system and Fe—Al system intermetallic compounds.

In this case, the compound layer preferably contains both of the Al—Mg system intermetallic compound and the Fe—Al system intermetallic compound, and preferably includes the composite structure composed of $Al_3Mg_2$ and $FeAl_3$ in view of improving a joint intensity. Furthermore, the reaction layer including the intermetallic compounds layer is more preferably composed of only the Al—Mg system and Fe—Al system intermetallic compounds without including the eutectic melting reaction product.

Meanwhile, when the metal D is Ga, the respective regenerated surfaces of the magnesium material and the steel material are joined via the compound layer containing the Mg—Ga system and Fe—Ga system intermetallic compounds.

In this case, the compound layer preferably contains both of the Mg—Ga system intermetallic compound and the Fe—Ga system intermetallic compound, and preferably includes the composite structure composed of $MgGa_2$ and $FeGa_3$ in view of improving a joint intensity. Furthermore, the reaction layer including the intermetallic compound layers is more preferably composed of only the Mg—Ga system and Fe—Ga system intermetallic compounds without including the eutectic melting reaction product.

The thickness of the compound layer is 0.08 μm or more, preferably 2.5 μm or less. Namely, when the thickness of the compound layer is less than 0.08 μm, the joint surface has an uneven joint condition in which joined portions and unjoined portions are mixed, which may cause a disadvantage of being not able to obtain a sufficient joint intensity. Thus, in order to maintain the joint surface with an even and reliable joint condition, the thickness of the compound layer is preferably 0.08 μm or more.

EXAMPLE

Hereinafter, the present invention will be explained more specifically based on examples.

With regard to the dissimilar metal joint between the magnesium material as the first material and steel as the second material, a bare steel plate and the zinc-plated steel plate plated with zinc (the metal C) were used as a steel material. In addition, pure magnesium, and three types of magnesium alloy that had different added amounts of aluminum (the metal D) from each other were prepared as a magnesium material. Then, the steel materials and the magnesium materials were joined under various conditions, followed by examining a relationship between each interface structure to be obtained and intensity thereof.

Figure 12:
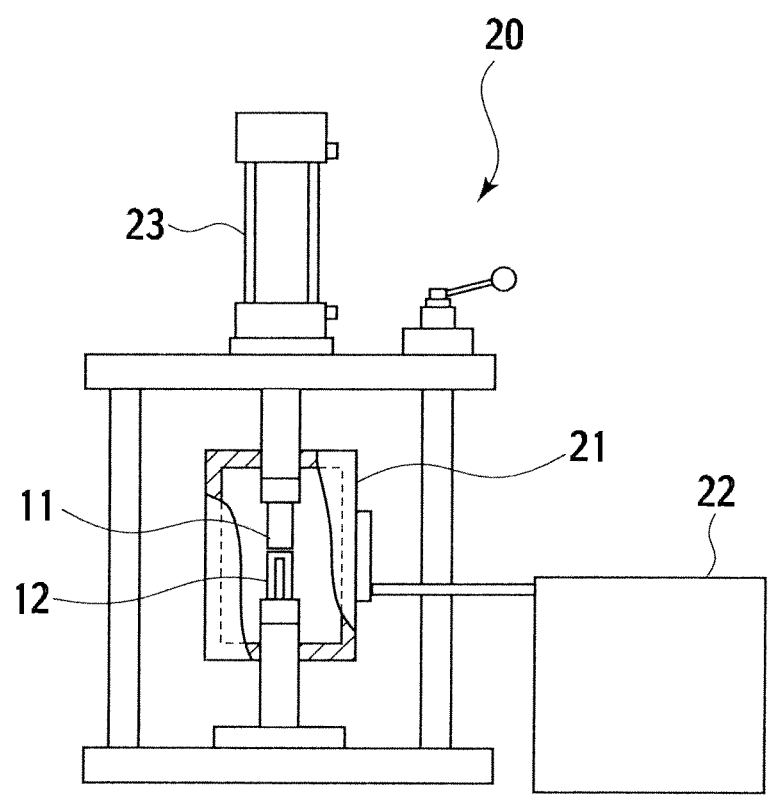
FIG. 12 is a schematic view showing a configuration of a diffusion joint device used in examples of the present invention.

FIG. 12 is a schematic view showing a structure of the joint device used in the examples. A joint device 20 shown in the figure is a common diffusion joint device, including a heating furnace 21, a temperature controller 22 for controlling atmosphere temperature in the heating furnace 21, and a pressure device 23.

While applying predetermined pressure to a cylindrical magnesium material 11 and an inverted U-shaped steel material 12 placed in the heating furnace 21, each predetermined temperature was controlled by the temperature controller 22. After maintaining the temperature in each example for predetermined time, heating was stopped to cool down.

With regard to joint conditions, the pressure level was set to 5 MPa, the joint temperature was set at within a range of 425° C. to 500° C., and the joint time was for 5 to 60 minutes. In order to measure the joint intensity after joining, a T-tensile test was performed to measure tensile strength.

In addition, conditions such as a constitution and a thickness of the reaction layer in the joint interface in each example were examined by a scanning electron microscope, an energy dispersive X-ray spectroscopy, and an X-ray diffraction device. The results thereof are shown in Table 1. In the table, the tensile strength of less than 30 MPa is indicated by "B", the tensile strength of 30 to less than 50 MPa is indicated by "A", the tensile strength of 50 to 70 MPa is indicated by "AA", and the tensile strength of more than 70 MPa is indicated by "AAA". Meanwhile, the examples in which the materials could not be joined are indicated by "C".

In these examples, $Al_3Mg_2$ was not formed since the added amount of Al in the magnesium alloy material was 3%, which was relatively low, although $FeAl_3$ was formed on the joint interface. In addition, since the diffusion joint was employed in these examples, the average thickness in the reaction layer was less than 0.5 μm, and the reaction layer was formed

TABLE I

Figure 13:
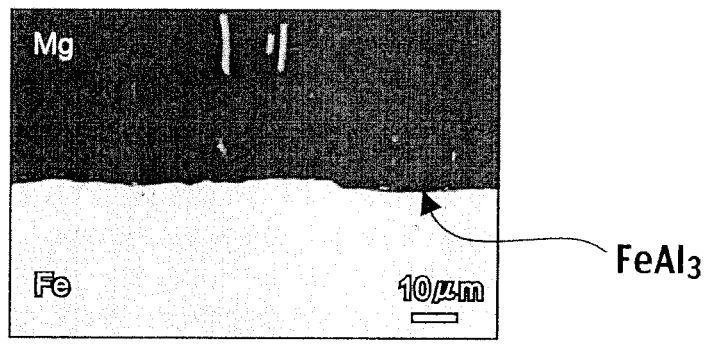
FIG. 13 shows electron microscope photographs showing joint interface structures obtained by Examples 3, 6 and 8 of the present invention.
Figure 13:
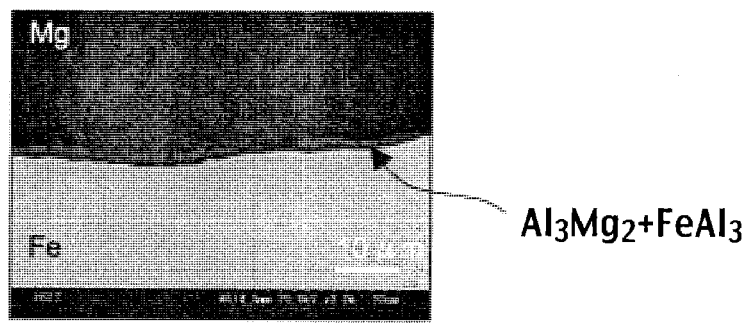
Figure 13:
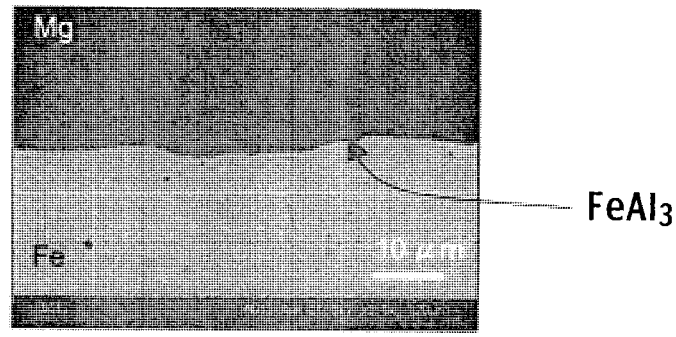

| Section | Material To Be Joined | | Diffusion Joint Condition | | Interface Structure | | | Note |
|---|---|---|---|---|---|---|---|---|
| | Steel Material | Magnesium Material | Joint Temperature (°C.) | Joint Time (min.) | Reaction Layer Constitution | Thickness (μm) | Joint Intensity | |
| Example 1 | Zinc-Plated Steel Plate | 3% Al—Mg | 450 | 5 | $FeAl_3$ | Less Than 0.5 | A | |
| 2 | Zinc-Plated Steel Plate | 3% Al—Mg | 450 | 10 | $FeAl_3$ | Less Than 0.5 | A | |
| 3 | Zinc-Plated Steel Plate | 3% Al—Mg | 450 | 20 | $FeAl_3$ | Less Than 0.5 | A | FIG. 13(A) |
| 4 | Zinc-Plated Steel Plate | 3% Al—Mg | 450 | 60 | $FeAl_3$ | Less Than 0.5 | A | |
| 5 | Zinc-Plated Steel Plate | 6% Al—Mg | 450 | 5 | $Al_3Mg_2 + FeAl_3$ | 1.5 | AAA | |
| 6 | Zinc-Plated Steel Plate | 6% Al—Mg | 450 | 10 | $Al_3Mg_2 + FeAl_3$ | 2 | AAA | FIG. 13(B) |
| 7 | Zinc-Plated Steel Plate | 6% Al—Mg | 450 | 20 | $FeAl_3$ | 2.5 | AA | |
| 8 | Zinc-Plated Steel Plate | 6% Al—Mg | 450 | 60 | $FeAl_3$ | 4 | A | FIG. 13(C) |
| 9 | Zinc-Plated Steel Plate | 9% Al—Mg | 425 | 10 | $Al_3Mg_2 + FeAl_3$ | 1.5 | AAA | |
| 10 | Zinc-Plated Steel Plate | 9% Al—Mg | 425 | 20 | $Al_3Mg_2 + FeAl_3$ | 2 | AAA | |
| 11 | Zinc-Plated Steel Plate | 9% Al—Mg | 425 | 60 | $FeAl_3$ | 4 | A | |
| Comparative Example 1 | Bare Steel Plate | Pure Mg | 450 to 500 | 5 to 60 | Retention of Oxide Film | — | C | |
| 2 | Bare Steel Plate | 3% Al—Mg | 450 to 500 | 5 to 60 | Retention of Oxide Film | — | C | |
| 3 | Bare Steel Plate | 6% Al—Mg | 450 to 500 | 5 to 60 | Retention of Oxide Film | — | C | |
| 4 | Bare Steel Plate | 9% Al—Mg | 450 to 500 | 5 to 60 | Retention of Oxide Film | — | C | |
| 5 | Zinc-Plated Steel Plate | Pure Mg | 450 to 500 | 5 to 60 | No Reaction Layer | 0 | C | |
| 6 | Zinc-Plated Steel Plate | 3% Al—Mg | 425 | 10 | Mg—Zn Eutectic | 15 | B | |
| 7 | Zinc-Plated Steel Plate | 6% Al—Mg | 425 | 5 | Mg—Zn Eutectic | 8 | B | |
| 8 | Zinc-Plated Steel Plate | 9% Al—Mg | 425 | 5 | Mg—Zn Eutectic + $FeAl_3$ | 4 | B | |

As shown in Table 1, Comparative Examples 1 to 4 used the bare steel plates not plated with zinc as a steel material. As a result, the oxide film could not be removed since Mg—Zn eutectic melting was not caused. Accordingly, the materials could not be joined even the joint conditions were varied in various combinations.

Since Comparative Example 5 used the zinc-plated steel plate plated with zinc, the oxide film on the surface of the magnesium material could be removed due to the Mg—Zn eutectic melting. However, since the magnesium material was pure magnesium not containing Al, the reaction layer was not formed on the joint interface, and a good joint could not be achieved.

In the respective Comparative Examples 6 to 8, the joint temperature was low, and the joint time was relatively short. As a result, the Mg—Zn eutectic melting reaction product could not be removed from the joint interface and the joint intensity was low although the Fe—Al system intermetallic compound was slightly formed when the content of Al in the magnesium material was high.

Meanwhile, Examples 1 to 4 used the zinc-plated steel plates as a steel material, and used 3% of Al—Mg alloy as a magnesium alloy material.

unevenly. Accordingly, the joint intensity was slightly low although the joint was achieved.

Examples 5 to 11 used the zinc-plated steel plates as a steel material, and used 6% of Al—Mg alloy and 9% of Al—Mg alloy as a magnesium alloy material. These examples contained the added amount of Al sufficiently. Therefore, particularly in Examples 5, 6, 9 and 10, the composite reaction layer in each example composed of $Al_3Mg_2$ and $FeAl_3$ was formed on the joint interface. Moreover, the thickness of the reaction layer was 0.5 μm or more and the reaction layer was formed evenly. Thus, it was confirmed that these examples could obtain a high joint intensity in which the tensile strength was above 70 MPa.

Meanwhile, the whole thickness of the reaction layer became thicker as the joint time was longer, and diffusion of Mg was promoted as time passed. As a result, the composite reaction layer composed of $Al_3Mg_2$ and $FeAl_3$ formed once was changed to a single reaction layer composed of $FeAl_3$. In such a case, although the joint ability between the reaction layer and the steel side was high, the joint ability between the reaction layer and the magnesium side was insufficient. Thus, it was confirmed that the joint intensity tended to be slightly lowered especially in Examples 8 and 11.

FIGS. 13(A) to 13(C) show observation results of the joint interfaces of Examples 3, 6 and 8 observed by the scanning electron microscope as representative examples of the joint structures of the present invention.

Figure 14:
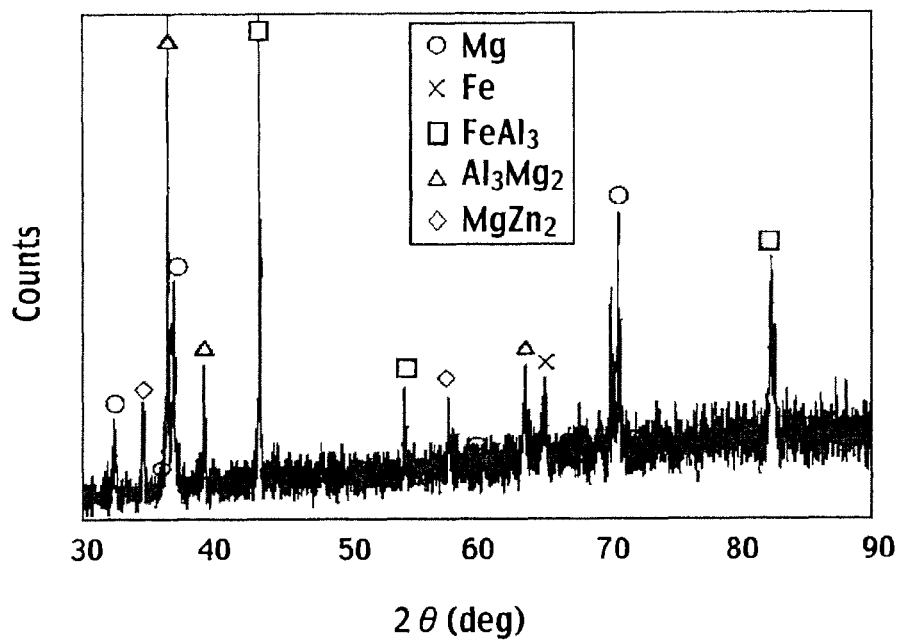
FIG. 14 shows charts showing X-ray diffraction results of each intermetallic compound present on a joint interface obtained by Examples 6 and 8 of the present invention.
Figure 14:
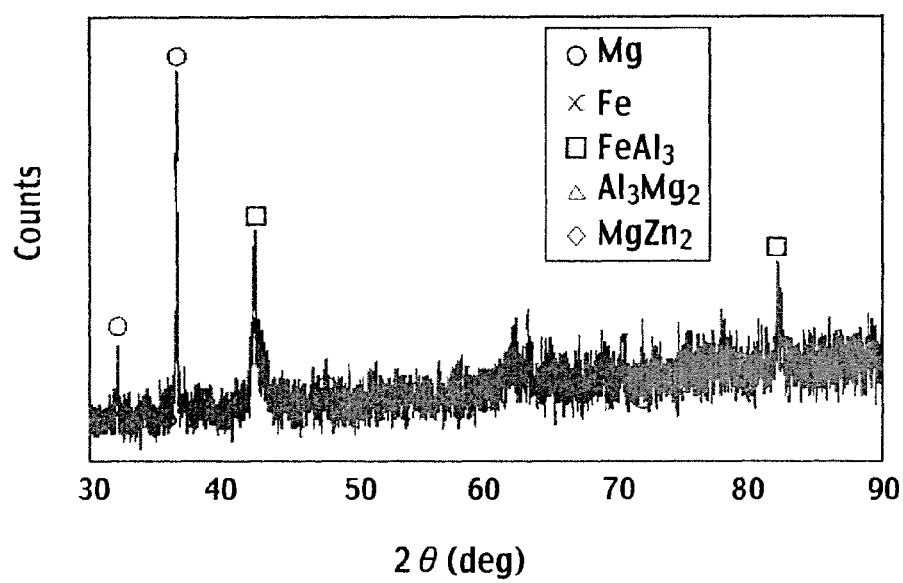

FIGS. 14(A) and 14(B) are charts showing the X-ray diffraction results of each intermetallic compound present on the joint interface in Examples 6 and 8, respectively.

As shown in FIG. 13(A), only $FeAl_3$ was formed on the joint interface in Example 3. Moreover, the reaction layer was formed unevenly having the average thickness of less than 5 μm. Thus, it is considered that Example 3 resulted in a slightly insufficient joint intensity.

On the other hand, FIG. 13(B) is a constitution showing the joint portion taken by the electron microscope in Example 6 according to the present invention As can be seen from the composition analysis result by the X-ray diffraction shown in FIG. 14(A), the composite reaction layer composed of $Al_3Mg_2$ and $FeAl_3$ was formed evenly on the joint interface. Thus, it is recognized that Example 6 could obtain the highest joint intensity in the examples.

FIG. 13(C) is a constitution showing the joint portion taken by the electron microscope in Example 8 according to the present invention. As can be seen from the composition analysis result by the X-ray diffraction shown in FIG. 14(B), the single reaction layer composed of $FeAl_3$ was formed evenly on the joint interface, in which the layer was slightly thicker. However, Example 8 could not obtain a sufficient joint ability between the magnesium alloy material and the reaction layer. Thus, it is recognized that the joint intensity was slightly lowered.

Examples 1 to 11 described above are the examples that employed the diffusion joint as a joint process, in which the magnesium alloy including aluminum as the metal D was used as the first material and the zinc-plated steel plate was used as the second material.

Meanwhile, Examples 12 to 22 described hereinbelow are the examples that employed the zinc-aluminum alloy-plated steel plate or the aluminum-zinc alloy-plated steel plate as the second material, and employed a resistance spot welding machine for joining. The zinc-aluminum alloy-plated steel plate and the aluminum-zinc alloy-plated steel plate were plated with metal in which the metal D of aluminum and the metal C of zinc were preliminarily alloyed.

With regard to the dissimilar metal joint between the magnesium material and steel, Examples 12 to 22 employed the zinc-plated steel plate plated with zinc (the metal C), four types of the zinc-aluminum alloy-plated steel plates having the different added amounts of aluminum (the metal D) from each other, and the aluminum-plated steel plate only plated with aluminum not including zinc.

As for the magnesium material, two types of magnesium alloy having the different added amounts of aluminum (the metal D) from each other or pure magnesium were prepared. Then, the steel materials and the magnesium materials were joined under various conditions by the resistance spot welding in these examples, followed by examining a relationship between each interface structure to be obtained and intensity thereof. Note that, the magnesium material plate with the thickness of 1.0 mm and the steel plate with the thickness of 0.55 mm were used.

Figure 15:
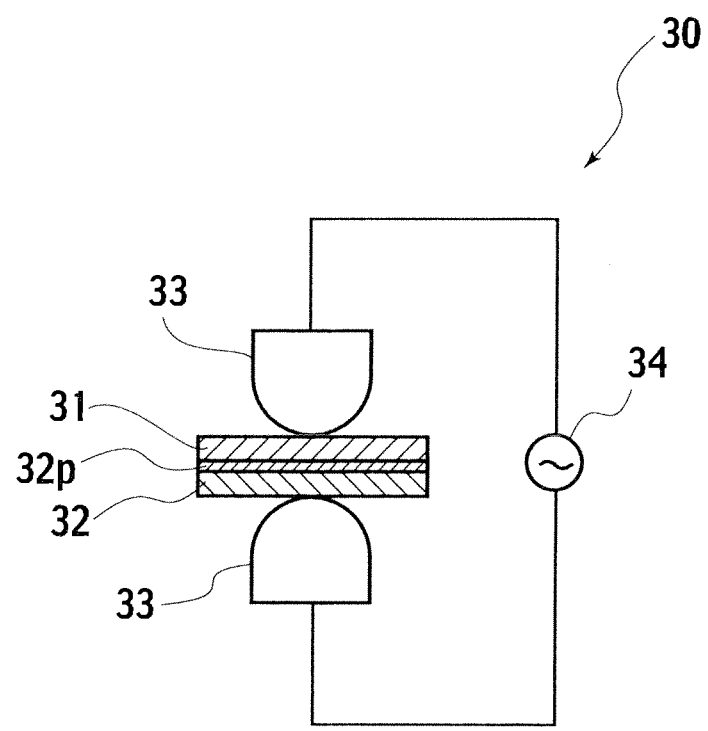
FIG. 15 is a schematic view showing a configuration of a resistance spot welding device used in examples of the present invention.

FIG. 15 is a schematic view showing a structure of the joint device used in the examples. A joint device 30 shown in the figure is a common resistance spot welding device.

In the figure, the joint device 30 includes a pair of electrodes 33. While the electrodes 33 applied predetermined pressure to the magnesium material plate 31 and each steel plate 32, in which the respective steel plates were plated variously in each example, an AC power supply 34 applied current for predetermined time. Thus, heat generated by electric resistance on the joint interface was utilized, thereby performing joining. Note that, the electrodes 33 were composed of chromium copper, in which a tip curvature radius R was 40 mm.

With regard to joint conditions, the pressure level was set to 3 kN, the joint time was for 240 msec, and the welding current was set to within a range of 16000 to 30000 A. In order to measure the joint intensity after joining, a tensile shear test was performed for the measurement.

In addition conditions such as a constitution and a thickness of the reaction layer in the joint interface in each example were examined by a scanning electron microscope, an energy dispersive X-ray spectroscopy, and an X-ray diffraction device.

The results thereof are shown in Table 2. In the table, the joint strength of less than 2.5 kN was evaluated as "B", the joint strength of 2.5 to less than 3.0 kN was evaluated as "A", the joint strength of 3.0 to 3.5 kN was evaluated as "AA", and the joint strength of more than 3.5 kN was evaluated as "AAA".

TABLE 2

Figure 16:
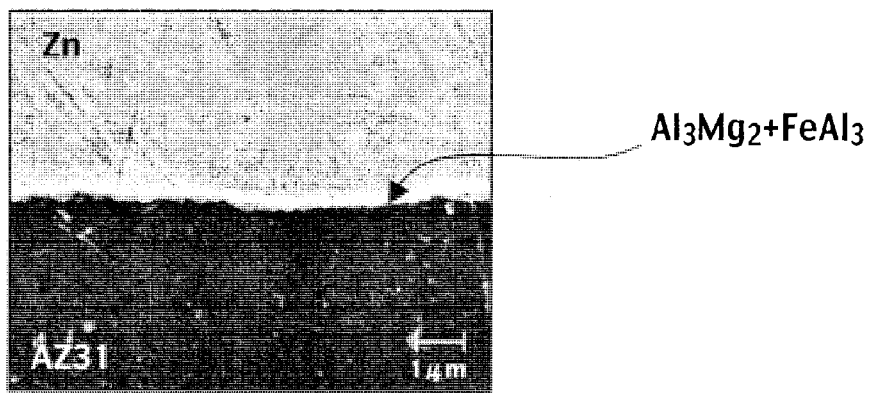
FIG. 16 shows electron microscope photographs showing joint interface structures obtained by Examples 12, 13 and 15 of the present invention.
Figure 16:
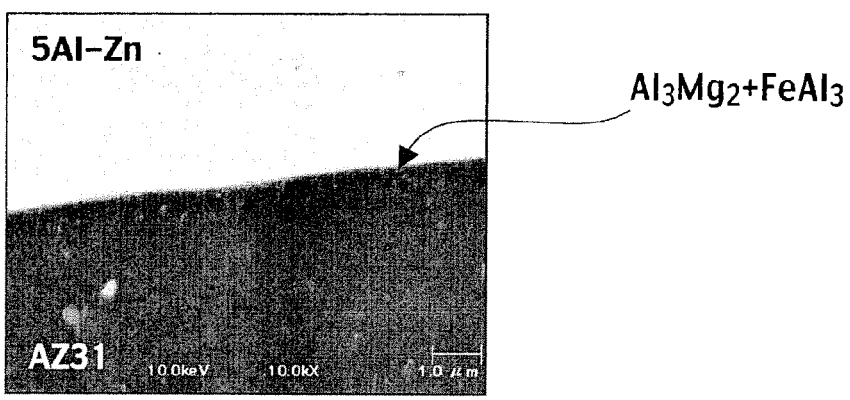
Figure 16:
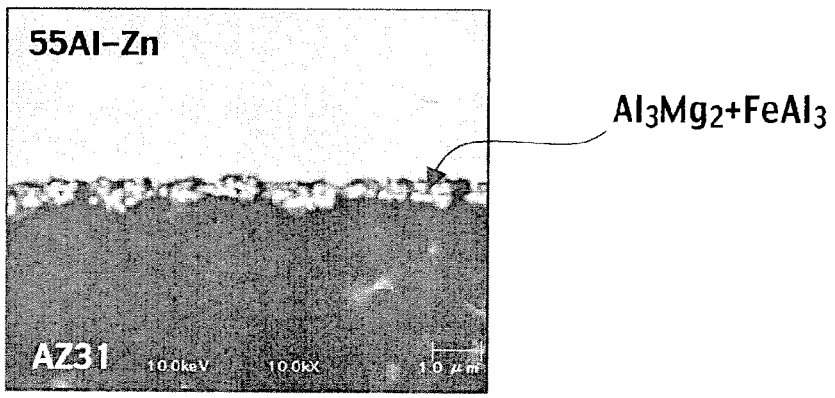

| Section | | Material To Be Joined | | Joint | Interface Structure | | | |
|---|---|---|---|---|---|---|---|---|
| | | Steel Material | Magnesium Material | Current Value (A) | Reaction Layer Constitution | Thickness (μm) | Joint Intensity | Note |
| Example | 12 | Zinc-Plated Steel Plate | 3% Al—Mg | 28000 | $Al_3Mg_2 + FeAl_3$ (Composite Layer) | 0.1 | AA | FIG. 16(A) |
| | 13 | Zn—5% Al Alloy-Plated Steel Plate | 3% Al—Mg | 25000 | $Al_3Mg_2 + FeAl_3$ (Composite Layer) | 0.4 | AAA | FIG. 16(B) |
| | 14 | Zn—30% Al Alloy-Plated Steel Plate | 3% Al—Mg | 23000 | $Al_3Mg_2 + FeAl_3$ (Composite Layer) | 0.7 | AAA | |
| | 15 | 55% Al—Zn Alloy-Plated Steel Plate | 3% Al—Mg | 23000 | $Al_3Mg_2 + FeAl_3$ (Composite Layer) | 1 | AAA | FIG. 16(C) |
| | 16 | Zinc-Plated Steel Plate | 6% Al—Mg | 28000 | $Al_3Mg_2 + FeAl_3$ (Composite Layer) | 0.2 | AA | |
| | 17 | Zn—5% Al Alloy-Plated Steel Plate | 6% Al—Mg | 25000 | $Al_3Mg_2 + FeAl_3$ (Composite Layer) | 0.3 | AAA | |
| | 18 | Zn—30% Al Alloy-Plated Steel Plate | 6% Al—Mg | 23000 | $Al_3Mg_2 + FeAl_3$ (Composite Layer) | 0.5 | AAA | |
| | 19 | 55% Al—Zn Alloy-Plated Steel Plate | 6% Al—Mg | 23000 | $Al_3Mg_2 + FeAl_3$ (Composite Layer) | 1.2 | AAA | |
| | 20 | 65% Al—Zn Alloy-Plated Steel Plate | 3% Al—Mg | 20000 | $Al_3Mg_2/FeAl_3$ (Double Layer) | 2 | A | |

TABLE 2-continued

| Section | | Material To Be Joined | | Joint Current Value (A) | Interface Structure | | | Note |
|---|---|---|---|---|---|---|---|---|
| | | Steel Material | Magnesium Material | | Reaction Layer Constitution | Thickness (μm) | Joint Intensity | |
| | 21 | 65% Al—Zn Alloy-Plated Steel Plate | 6% Al—Mg | 20000 | $Al_3Mg_2/FeAl_3$ (Double Layer) | 2.1 | A | |
| | 22 | 65% Al—Zn Alloy-Plated Steel Plate | Pure Mg | 20000 | $Al_3Mg_2/FeAl_3$ (Double Layer) | 2 | A | |
| Comparative Example | 9 | Aluminum-Plated Steel Plate | 3% Al—Mg | 18000 | Retention of Oxide Film | 2.7 | B | |
| | 10 | Aluminum-Plated Steel Plate | 6% Al—Mg | 18000 | Retention of Oxide Film | 3 | B | |

As shown in Table 2, since Comparative Examples 9 and 10 used the aluminum-plated steel plate as a steel material in which zinc was not included, the oxide film could not be removed smoothly. In addition, since the excessive amount of aluminum was contained, the composite compound layer in which $Al_3Mg_2$ and $FeAl_3$ were mixed was not formed on the joint interface while having a two-layered structure. Moreover, the reaction layer was composed of thick $FeAl_3$, and the whole thickness of the compound layer exceeded 2.5 μm. As a result, the joint intensity was lowered, and a good joint could not be obtained.

Examples 12 and 16 are the examples that used the zinc-plated steel plate as a steel material, and 3% of Al—Mg alloy and 6% of Al—Mg alloy, respectively, as a magnesium alloy material, similar to the above-described examples.

These examples contained the added amount of Al enough to function effectively in the magnesium alloy material. In addition, although the thickness was slightly thin, the composite compound layer in which $Al_3Mg_2$ and $FeAl_3$ were mixed was formed on the joint interface, thereby achieving an effective joint. In this case, the thicknesses of the compound layers were 0.08 μm to 0.12 μm in Example 12, and 0.2 μm in Example 16, respectively.

Examples 13 to 15 and Examples 17 to 19 are the examples that used the zinc-aluminum alloy-plated steel plate or aluminum-zinc alloy-plated steel plate plated with zinc-aluminum alloy as a steel material, and used 3% of Al—Mg alloy or 6% of Al—Mg alloy as a magnesium alloy material.

These examples contained the added amount of Al sufficiently, and the composite compound layer in which $Al_3Mg_2$ and $FeAl_3$ were mixed was formed on the joint interface. In addition, the compound layer was formed evenly having the layer thickness of 0.3 μm to 1.2 μm. Therefore, it was confirmed that a quite high joint intensity that exceeded 3.5 kN could be obtained.

Examples 20 and 21 are the examples that used the aluminum-zinc alloy plated steel plate as a steel material, in which the added amount of Al in the plated layer was a high rate of 65%.

These examples contained the excessive amount of aluminum. Therefore, the composite compound layer as described above was not formed on the joint interface. Moreover, the reaction layer was mainly composed of $Al_3Mg_2$ and $FeAl_3$ having a thick two-layered structure, and the whole thickness of the compound layer was 2 μm or more. As a result, the joint intensity was slightly lowered.

Example 22 is the example that used the aluminum-zinc alloy-plated steel plate as a steel material in which the added amount of Al in the plated layer was a high rate of 65%, and used pure magnesium as a magnesium material.

This example contained the excessive amount of aluminum. Therefore, the composite compound layer as described above was not formed on the joint interface. Moreover, the reaction layer was mainly composed of $Al_3Mg_2$ and $FeAl_3$ having a thick two-layered structure, and the whole thickness of the compound layer was 2 μm or more. As a result, the joint intensity was slightly lowered.

FIGS. 16(A) to 16(C) show the observation results by the scanning electron microscope observing the joint interfaces of Examples 12, 13 and 15, respectively, as representative examples of the joint structures of the present invention.

As shown in FIG. 16(A), the composite compound layer of Example 12 in which $Al_3Mg_2$ and $FeAl_3$ were mixed was quite thinly and evenly formed on the joint interface having the thickness of approximately 0.1 μm. Thus, it is recognized that a good joint intensity could be obtained.

Similarly, FIG. 16(B) is a constitution showing the joint portion taken by the electron microscope in Example 13 according to the present invention. The composite compound layer in which $Al_3Mg_2$ and $FeAl_3$ were mixed was evenly formed on the joint interface having the thickness of approximately 0.4 μm. Thus, it is recognized that Example 13 could obtain the highest joint intensity in the examples.

FIG. 16(C) is a constitution showing the joint portion taken by the electron microscope in Example 15 according to the present invention. The composite reaction layer composed of $Al_3Mg_2$ and $FeAl_3$ was steadily formed on the joint interface having the thickness of approximately 1.0 μm. It is recognized that Example 15 could also obtain a high joint intensity.

Examples 23 to 28 described hereinbelow are the examples that used a tin-plated steel plate, a copper-plated steel plate or a silver-plated steel plate as the second material plated with tin, copper or silver as the metal C, respectively. In addition, Examples 29 and 30 employed magnesium alloy, as the first material, including gallium as the metal D.

With regard to the dissimilar metal joint between the magnesium material and steel, Examples 23 to 28 used the tin-plated steel plate, the copper-plated steel plate and the silver-plated steel plate as a steel material. In addition, two types of magnesium alloy having the different added amounts of aluminum (the metal D) from each other were prepared as a magnesium material in Examples 23 to 28.

Examples 29 and 30 used the zinc-plated steel plate as a steel material. In addition, two types of magnesium alloy having the different added amounts of gallium (the metal D) from each other were prepared as a magnesium material in Examples 29 and 30, respectively.

Then, the steel materials and the magnesium materials were joined under various conditions by the resistance spot welding in Examples 23 to 30, followed by examining a relationship between each interface structure to be obtained and intensity thereof. Note that, the magnesium material plate with the thickness of 1.0 mm and the steel plate with the thickness of 0.55 mm were used.

The resistance spot welding was performed by the joint device shown in FIG. 15. With regard to joint conditions, the pressure level was set to 3 kN, the joint time was for 240 msec, and the welding current was set to within a range of 16000 to 30000 A. In order to measure the joint intensity after joining, a tensile shear test was performed for the measurement.

The results thereof are shown in Table 3. In the table, the joint strength of less than 2.5 kN was evaluated as "B", the joint strength of 2.5 to less than 3.0 kN was evaluated as "A", the joint strength of 3.0 to 3.5 kN was evaluated as "AA", and the joint strength of more than 3.5 kN was evaluated as "AAA".

TABLE 3

| | | Material To Be Joined | | | Interface Structure | | |
|---|---|---|---|---|---|---|---|
| Section | | Steel Material | Magnesium Material | Joint Current Value (kA) | Reaction Layer Constitution | Thickness (μm) | Joint Intensity |
| Example | 23 | Tin-Plated Steel Plate | 3% Al—Mg | 22 | $Al_3Mg_2$ + $FeAl_3$ (Composite Layer) | 0.1 | AA |
| | 24 | Tin-Plated Steel Plate | 6% Al—Mg | 22 | $Al_3Mg_2$ + $FeAl_3$ (Composite Layer) | 0.2 | AA |
| | 25 | Copper-Plated Steel Plate | 3% Al—Mg | 29 | $Al_3Mg_2$ + $FeAl_3$ (Composite Layer) | 0.1 | AA |
| | 26 | Copper-Plated Steel Plate | 6% Al—Mg | 29 | $Al_3Mg_2$ + $FeAl_3$ (Composite Layer) | 0.2 | AA |
| | 27 | Silver-Plated Steel Plate | 3% Al—Mg | 30 | $Al_3Mg_2$ + $FeAl_3$ (Composite Layer) | 0.1 | AA |
| | 28 | Silver-Plated Steel Plate | 6% Al—Mg | 30 | $Al_3Mg_2$ + $FeAl_3$ (Composite Layer) | 0.2 | AA |
| | 29 | Zinc-Plated Steel Plate | 20% Ga—Mg | 20 | $MgGa_2$ + $FeGa_3$ (Composite Layer) | 0.4 | AA |
| | 30 | Zinc-Plated Steel Plate | 40% Ga—Mg | 20 | $MgGa_2$ + $FeGa_3$ (Composite Layer) | 0.5 | AA |

Examples 23 and 24 used the tin-plated steel plate as a steel material. Example 26 used the copper-plated steel plate as a steel material, and Examples 27 and 28 used the silver-plated steel plate as a steel material. In addition, these examples employed 3% of Al—Mg alloy or 6% of Al—Mg alloy as a magnesium alloy material.

Examples 23 to 28 contained the added amount of Al enough to function effectively in the magnesium alloy material, similar to Examples 12 and 16 using the zinc-plated steel plate as a steel material. In addition, although the thickness was slightly thin, the composite compound layer in which $Al_3Mg_2$ and $FeAl_3$ were mixed was formed on the joint interface, thereby achieving an effective joint. In this case, the thicknesses of the compound layers were 0.1 μm to 0.2 μm in these examples.

Examples 29 and 30 used the zinc-plated steel plate as a steel material, and employed 20% of Ga—Mg alloy and 40% of Ga—Mg alloy as a magnesium alloy material, respectively.

Examples 29 and 30 employed the magnesium alloy material in which Ga was added to magnesium, which is different from the other examples. The composite reaction layers of Examples 29 and 30 composed of $MgGa_2$ and $FeGa_3$ were formed on the joint interfaces, which resulted in an effective joint. In this case, the thicknesses of the compound layers were approximately 0.1 μm to 0.2 μm.

The entire contents of Japanese Patent Application No. P2008-007569 (filed on Jan. 17, 2008), Japanese Patent Application No. P2008-100411 (filed on Apr. 8, 2008), and Japanese Patent Application No. P2009-006437 (filed on Jan. 15, 2009) are herein incorporated by reference.

Although the embodiment adopting the invention by the inventors has been described above, the invention is not limited to the description and the figures composing a part of the disclosure of the present invention by the embodiment. Other embodiments, examples and operation techniques modified by those skilled in the art based on the above-described embodiment are obviously all included in the scope of the present invention.

The invention claimed is:

1. A method of joining dissimilar metals, comprising:
   interposing a third material containing a metal C between a first material containing magnesium as a main component and a second material containing iron as a main component;
   causing eutectic melting between the metal C and at least one of magnesium and iron; and
   removing a reaction product produced by the eutectic melting from a joint interface, thereby joining the first material and the second material,
   wherein a metal D is added to the third material and/or a material mainly containing magnesium or iron that causes the eutectic melting with the metal C, and an intermetallic compound containing the metal D and at least one of magnesium and iron is formed on the joint interface, thereby the first material and the second material are joined via a compound layer containing the intermetallic compound.

2. The method of joining dissimilar metals according to claim 1, wherein the intermetallic compound containing magnesium and the metal D and the intermetallic compound containing iron and the metal D are mixed in the compound layer.

3. The method of joining dissimilar metals according to claim 1, wherein the first material is a magnesium alloy material, the second material is a steel material, and the metal D is aluminum and/or gallium, and
   the third material containing the metal C causing the eutectic melting with magnesium is preliminarily adhered to a joint surface of the steel material.

4. The method of joining dissimilar metals according to claim 3, wherein the third material is adhered to the joint surface of the second material by a coating method selected from plating, thermal spraying, vapor deposition and film coating.

5. The method of joining dissimilar metals according to claim 1, wherein the metal C contained in the third material is at least one metal selected from the group consisting of Zn, Sn, Cu, Ag and Ni.

6. The method of joining dissimilar metals according to claim 1, wherein the third material is an alloy containing Zn as the metal C and Al as the metal D.

7. The method of joining dissimilar metals according to claim 6, wherein an Al—Zn plated steel plate preliminarily plated with an Al—Zn alloy on a joint surface thereof is used as the second material.

8. The method of joining dissimilar metals according to claim 7, wherein an added amount of Al in a plated layer in the Al—Zn plated steel plate is less than 65% by mass.

9. A joint structure of dissimilar metals, comprising:
   a first material containing magnesium as a main component;
   a second material containing iron as a main component; and
   a compound layer containing an intermetallic compound containing a metal D and one or both of magnesium and iron, the metal D comprising at least one of aluminum and gallium, wherein an effluent containing an eutectic melting reaction product formed of a metal C and at least one of magnesium and iron is removed from a periphery of the compound layer, and regenerated surfaces of the first and second materials are joined via the compound layer, and wherein the metal C comprises a metal selected from the group consisting of zinc, tin, copper, silver and nickel.

10. The joint structure of dissimilar metals according to claim 9, wherein the first material is a magnesium alloy material, the second material is a steel material, and the metal D is aluminum and/or gallium.

11. The joint structure of dissimilar metals according to claim 10, wherein the metal D is aluminum, and the regenerated surfaces of the magnesium alloy material and the steel material are joined via the compound layer containing an Al—Mg system intermetallic compound and/or an Fe—Al system intermetallic compound.

12. The joint structure of dissimilar metals according to claim 11, wherein the compound layer includes a composite structure containing $Al_3Mg_2$ and $FeAl_3$.

13. The joint structure of dissimilar metals according to claim 10, wherein the metal D is gallium, and the regenerated surfaces of the magnesium alloy material and the steel material are joined via the compound layer containing a Mg—Ga system intermetallic compound and/or an Fe—Ga system intermetallic compound.

14. The joint structure of dissimilar metals according to claim 13, wherein the compound layer includes a composite structure containing $MgGa_2$ and $FeGa_3$.

15. The joint structure of dissimilar metals according to claim 10, wherein an average thickness of the compound layer is 0.08 µm or more.

* * * * *